Patented Aug. 9, 1938

2,126,611

UNITED STATES PATENT OFFICE 2,126,611

PURIFICATION AND DECOLORIZATION OF ACETIC ACID

Edgar C. Britton, Midland, Mich., assignor to The Dow Chemical Company, Midland, Mich., a corporation of Michigan No Drawing. Application March 31, 1937, Serial No. 134,123

7 Claims. (Cl. 260—541)

This invention concerns a method of purifying acetic acid, particularly of removing impurities which discolor acetic acid produced from wood, vinegar, or other natural sources.

Acetic acid from such natural sources is usually colored and contains a variety of impurities, including those causing the color, which cannot satisfactorily be removed by distillation or other usual treatments, e. g. treatment with lime to form calcium acetate, which is separated from the liquor and subsequently acidified. The impurities causing color are particularly objectionable when the acetic acid is to be employed in making other products, such as ethyl acetate, since the color frequently carries over into such products and cannot readily be removed therefrom. Among the various impurities frequently present in acetic acid from natural sources are di-ketones, such as diacetyl and its homologues; aldehydes, such as glyoxal and crotonaldehyde; hydroxy-ketones; hydroxy-aldehydes; etc. An object of this invention is to provide a simple method whereby acetic acid from a natural source may be decolorized and purified.

I have discovered that the impurities associated with acetic acid from a natural source, particularly those discoloring the acid, may be removed by treating the impure acid preferably at elevated temperatures with a basic nitrogen compound containing at least two hydrogen atoms linked to the nitrogen, or a salt of such basic nitrogen compound with a weak acid, and thereafter distilling the mixture. Among the various nitrogen compounds which may be employed in the process are ammonia, methylamine, ethylamine, normal- or secondary-butylamine, aniline, toluidine, ammonium acetate, ammonium butyrate, ammonium oxalate, methylamine acetate, ammonium carbonate, etc. When a nitrogen compound other than a salt of an aliphatic acid is initially employed, it is probable that the nitrogen compound first reacts with the acetic acid to form such salt, e. g., ammonium acetate, and that the salt serves as an agent for converting the organic impurities of the acetic acid into relatively high boiling compounds which are readily separated from the acetic acid during the subsequent step of distilling the mixture.

I have also found that the reaction for conversion of the impurities of acetic acid into high boiling compounds may be catalyzed with metallic copper or a copper compound. A mere trace, e. g., 0.1 mole, of a copper compound per mole of the nitrogen compound is usually sufficient to catalyze the reaction and I prefer to use the copper compound in a proportion less than that chemically equivalent to the nitrogen compound.

The present invention is particularly adapted to removing from natural acetic acid the impurities which cannot satisfactorily be removed by usual methods, e. g. distillation, settling operations, treatment with lime, etc. The present method is advantageously employed in conjunction with such usual method, crude acetic acid from a natural source being first treated in accordance with known procedure to remove the readily separable impurities and thereafter further purified according to the invention to remove coloring matters and other impurities not removed by the first treatment. However, such preliminary treatment according to a usual method is not necessary, since substantially colorless acetic acid may be obtained by treating the crude acetic acid directly in accordance with the present invention.

In practicing the invention crude acetic acid is preferably first distilled, if necessary, to remove impurities readily separable by distillation. The acid, which may be aqueous or anhydrous, is then treated with a basic nitrogen compound or salt of the type hereinbefore mentioned and digested, with or without heating, preferably until a sample of acid, when distilled from the mixture, is colorless and substantially free of aldehydes. The heating may be carried out advantageously in a copper container, in which case the container furnishes the copper to catalyze the reaction, but it may, if desired, be carried out in other equipment, e. g., glass, enamelware, etc., in the absence of a catalyst or using added copper or a copper compound as the catalyst.

The proportion of nitrogen compound and the temperature and time of heating required to obtain satisfactory purification are dependent upon the initial purity of the acid, the particular nitrogen compound used as a purifying agent, the presence or absence of a catalyst, etc. In practice, however, from 0.01 to 0.03 molecular equivalent of ammonium acetate, or equivalent nitrogen compound is sufficient for the purification of ordinary crude acid. The mixture is heated, for example, at a temperature of 100° C. or higher in a copper-lined vessel, either at atmospheric pressure, or in a closed container under pressure at higher temperatures, e. g., 300° C. When the heating is carried out under pressure at temperatures considerably above 100° C., the time of heating required to convert the impurities into high boiling substances is, of course, reduced. After completing the heating operation with the nitrogen compound, acetic acid may be distilled from the mixture in colorless and substantially pure form.

In the following Examples 1–5 the crude acetic acid employed was obtained from the distillate from the destructive distillation of wood. Such distillate was partially purified and rendered substantially anhydrous by first treating with steam to remove methyl alcohol and other relatively volatile impurities, mechanically separating tars which settled from the residual liquor while hot, then extracting acetic acid from the liquor when a volatile solvent and distilling off the solvent to obtain partially purified and substantially anhydrous acetic acid of dark brown color, which contained wood tars along with other impurities. Such partially purified acetic acid was further purified according to the present invention as described in Examples 4 and 5, and is referred to in these examples as "crude anhydrous acetic acid". The acetic acid employed in Examples 1–3 was obtained by distilling this "crude anhydrous acetic acid" to remove readily separable impurities, such as wood tars. The substantially anhydrous acetic acid obtained in the distillate was of dark brown color and retained a variety of difficultly separable impurities, among which were diacetyl and homologues thereof, aldehydes, etc. Acetic acid of this quality is referred to in Examples 1–3 as "distilled crude acetic acid".

Example 1

200 grams of distilled crude acetic acid was treated with 6 grams of ammonium acetate and the mixture was boiled under reflux for 1 hour in the presence of metallic copper. The mixture was then redistilled, whereby the acetic acid was recovered in colorless form and substantially free from aldehydes.

Example 2

200 grams of distilled crude acetic acid was added to the still residue remaining from the treatment described in Example 1, and the resultant mixture was heated under reflux for 1 hour and then distilled. The acetic acid collected during distillation was colorless and substantially free from aldehydes.

Example 3

50 cubic centimeters of distilled crude acetic acid of the quality described in Example 1 was treated with 3 cubic centimeters of analine, and the mixture was distilled immediately from a copper-lined still. The first 8 cubic centimeters of distillate had a yellowish tinge, but the remainder of the distillate was colorless.

Example 4

60 cubic centimeters of crude anhydrous acetic acid was treated with 2.5 grams of ammonium acetate and the mixture was distilled from a copper-lined still. The acetic acid collected by said distillation was colorless.

Example 5

200 grams of crude anhydrous acetic acid, obtained by distillation of wood and subsequent dehydration and containing approximately 68.7 per cent by weight of acetic acid, was treated with 6 grams of ammonium acetate and the mixture was heated under reflux for 1 hour in the presence of metallic copper. It was then distilled whereby substantially all of the acetic acid was recovered in colorless form.

Example 6

A yellow mixture of 1 cubic centimeter of diacetyl and 50 cubic centimeters of glacial acetic acid was treated with 2.5 grams of ammonium acetate and heated under reflux in the presence of metallic copper for 3.75 hours. The mixture was then distilled, whereby substantially all of the acetic acid was recovered in colorless form.

During treatment of impure acetic acid with ammonium acetate as hereinbefore described, a considerable proportion of the ammonia in the salt is removed, presumably by reaction with the impurities, to liberate additional acetic acid, with the result that the quantity of acetic acid recovered by distilling the treated mixture may exceed the amount of acetic acid initially subjected to the treatment. If desired, the residue from the distillation may be treated with sulphuric acid or other mineral acid to liberate acetic acid from the small amount of ammonium acetate remaining therein and the liberated acetic acid may be recovered by conventional procedure, e. g., distillation or extraction with a solvent.

The purification process herein disclosed may be carried out continuously by adding ammonia, or other basic nitrogen compound or a salt of such compound with a weak acid, e g., ammonium acetate, to impure acetic acid, passing the resultant solution, preferably under pressure, through a heated conduit of such length that impurities in the acid are converted into higher boiling compounds during transit through the conduit, and permitting the liquid to flow from the conduit into a continuous still, wherein the acetic acid is distilled off continuously to recover the same in purified condition.

Crude acetic acid from natural sources, particularly pyroligneous acid from wood, frequently contains other lower aliphatic acids such as propionic and butyric acids as well as the usual impurities hereinbefore mentioned. During treatment of the crude acid according to the present method both the acetic acid and the other aliphatic acids present are decolorized and during or after the treatment the acids may be separated from one another, e. g., by distillation, to obtain them separately in purified form. Also, the aliphatic acids in the crude acid liquor may, if desired, initially be separated from one another and each individual acid may then be further purified and decolorized by treatment in accordance with the invention. Accordingly, the invention, although particularly directed to the purification of crude acetic acid, may be applied in purifying and decolorizing other aliphatic acids from natural sources. It may also be applied in purifying aliphatic carboxylic acids from other sources, e. g., synthetic acids, when the crude acids contain impurities such as normally accompany aliphatic acids derived from natural sources.

I claim:

1. The method which comprises treating a crude aliphatic acid from a natural source with a small proportion of a compound selected from the class consisting of basic nitrogen compounds containing at least 2 hydrogen atoms linked with the nitrogen and salts of such basic nitrogen compounds with weak acids and thereafter distilling the aliphatic acid from the mixture.

2. The method which comprises treating crude acetic acid with a small proportion of a compound selected from the class consisting of basic nitrogen compounds containing at least 2 hydrogen atoms linked with the nitrogen and salts of such basic nitrogen compounds with weak acids, and distilling relatively pure and/or colorless acetic acid from the mixture.

3. The method which comprises treating crude acetic acid with a small proportion of a compound selected from the class consisting of basic nitrogen compounds containing at least 2 hydrogen atoms linked with the nitrogen and salts of such basic nitrogen compounds with weak acids, heating the mixture in the presence of a copper-containing substance, and distilling relatively pure and/or colorless acetic acid from the mixture.

4. The method which comprises treating crude acetic acid with at least 0.01 chemical equivalent of a compound selected from the class consisting of basic nitrogen compounds containing at least 2 hydrogen atoms linked with the nitrogen and salts of such basic nitrogen compounds with weak acids, heating the mixture to a temperature of at least 100° C. in the presence of a copper-containing substance, and distilling relatively pure and/or colorless acetic acid from the mixture.

5. The method which comprises treating crude acetic acid with a small proportion of ammonia, heating the mixture, and thereafter distilling relatively pure acetic acid from the mixture.

6. The method which comprises treating crude acetic acid with a small proportion of ammonium acetate, heating the mixture, and thereafter distilling relatively pure acetic acid from the mixture.

7. The method which comprises treating crude acetic acid with a small proportion of a compound selected from the class consisting of basic nitrogen compounds containing at least two hydrogen atoms linked with the nitrogen and salts of such basic nitrogen compounds with weak acids, heating the mixture at superatmospheric pressure, and thereafter distilling relatively pure and/or colorless acetic acid from the mixture.

EDGAR C. BRITTON.